US010367886B2

(12) United States Patent
Harada et al.

(10) Patent No.: US 10,367,886 B2
(45) Date of Patent: Jul. 30, 2019

(54) INFORMATION PROCESSING APPARATUS, PARALLEL COMPUTER SYSTEM, AND FILE SERVER COMMUNICATION PROGRAM

(71) Applicant: FUJITSU LIMITED, Kawasaki-shi, Kanagawa (JP)

(72) Inventors: Koichiro Harada, Suntou (JP); Tsuyoshi Hashimoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 166 days.

(21) Appl. No.: 15/191,682

(22) Filed: Jun. 24, 2016

(65) Prior Publication Data

US 2017/0019476 A1    Jan. 19, 2017

(30) Foreign Application Priority Data

Jul. 13, 2015  (JP) ................................ 2015-139433

(51) Int. Cl.
  *H04L 29/08*  (2006.01)
  *G06F 9/54*   (2006.01)
  *H04W 4/02*   (2018.01)

(52) U.S. Cl.
  CPC ............ *H04L 67/1097* (2013.01); *G06F 9/54* (2013.01); *H04L 67/1014* (2013.01);
  (Continued)

(58) Field of Classification Search
  CPC ............. H04L 67/1014; H04L 67/1021; H04L 67/1097; G06K 2209/21; G06K 2209/40; H04W 4/02; G06F 9/54; G06F 2209/502
  See application file for complete search history.

(56) References Cited

U.S. PATENT DOCUMENTS 6,269,376 B1 *  7/2001  Dhillon .................. G06F 17/18
                                           707/613
9,461,876 B2 * 10/2016  Van Dusen ............. H04L 41/04
(Continued)

FOREIGN PATENT DOCUMENTS

JP        6-75930        3/1994
JP      2009-238252     10/2009
(Continued)

OTHER PUBLICATIONS

Lanza-Gutierrez et al., "A Parallel Evolutionary Approach to Solve the Relay Node Placement Problem in Wireless Sensor Networks", Genetic and Evolutionary Computation, Jul. 6, 2013, pp. 1157-1164.
(Continued)

*Primary Examiner* — Sargon N Nano
(74) *Attorney, Agent, or Firm* — Staas & Halsey LLP

(57) ABSTRACT

An information processing apparatus, among a plurality of information processing apparatuses that performs parallel computing processing in a parallel computer system, including a memory and a processor coupled to the memory and configured to execute a process including: calculating a centroid position of the information processing apparatuses based on a data length of data for which subsequent reading or writing from or to a file server is requested by the information processing apparatuses and position information on each of the information processing apparatuses; determining a first information processing apparatus that performs data relay according to the calculated centroid position; and collectively receiving or transmitting, when the determined first information processing apparatus that performs data relay is the information processing apparatus, the data for two or more of the information processing apparatuses.

6 Claims, 12 Drawing Sheets

(52) U.S. Cl.
CPC ........... *H04L 67/1021* (2013.01); *H04W 4/02* (2013.01); *G06F 2209/502* (2013.01)

(56) References Cited

U.S. PATENT DOCUMENTS

| | | | |
|---|---|---|---|
| 9,536,322 B1* | 1/2017 | Smith | G06K 9/4652 |
| 2004/0268088 A1 | 12/2004 | Lippincott et al. | |
| 2008/0120435 A1* | 5/2008 | Moreira | G06F 17/30224 |
| | | | 710/1 |
| 2008/0301254 A1* | 12/2008 | Bestler | H04L 49/90 |
| | | | 709/212 |
| 2011/0235522 A1 | 9/2011 | Matoba | |
| 2013/0073552 A1* | 3/2013 | Rangwala | G06F 17/30489 |
| | | | 707/737 |
| 2013/0100957 A1 | 4/2013 | Suzuki et al. | |
| 2014/0040349 A1* | 2/2014 | Matsuba | H04L 67/1097 |
| | | | 709/203 |
| 2015/0117539 A1* | 4/2015 | Kobayashi | H04N 19/176 |
| | | | 375/240.16 |
| 2015/0143114 A1 | 5/2015 | Chujo et al. | |
| 2015/0317253 A1* | 11/2015 | Fortin | G06F 12/0864 |
| | | | 711/137 |
| 2015/0371417 A1* | 12/2015 | Angelov | G06Q 10/101 |
| | | | 345/442 |
| 2017/0004098 A1* | 1/2017 | Das Sharma | G06F 13/385 |
| 2017/0031865 A1* | 2/2017 | Eyole | G06F 15/8076 |

FOREIGN PATENT DOCUMENTS

| | | |
|---|---|---|
| JP | 2011-175573 | 9/2011 |
| WO | WO 02/073470 A2 | 9/2002 |
| WO | WO 2011/002244 A2 | 1/2011 |

OTHER PUBLICATIONS

Extended European Search Report dated Dec. 2, 2016, in corresponding European Patent Application No. 16177650.5.

* cited by examiner

INFORMATION PROCESSING APPARATUS, PARALLEL COMPUTER SYSTEM, AND FILE SERVER COMMUNICATION PROGRAM

CROSS-REFERENCE TO RELATED APPLICATION

This application is based upon and claims the benefit of priority of the prior Japanese Patent Application No. 2015-139433, filed on Jul. 13, 2015, the entire contents of which are incorporated herein by reference.

FIELD

The embodiment discussed herein is related to an information processing apparatus, a parallel computer system, a file server communication program, and a file server communication method.

BACKGROUND

In recent years, a high performance computing (HPC) system has been achieved in which a cluster is constructed by connecting computers (hereinafter may be referred to as "computing nodes") by a high-speed network (see, for instance, Japanese Laid-open Patent Publication No. 2009-238252, Japanese Laid-open Patent Publication No. 2011-175573, and Japanese Laid-open Patent Publication No. 6-75930). When a parallel processing program is executed in such a cluster type parallel computer system, parallel processes are distributed to the computing nodes and are started up. When data exchange is performed between parallel processes, the performance of communication between computing nodes and file servers has an effect on the parallel computer system.

Meanwhile, in recent years, the amount of data handled by the parallel computer system is ever-increasing, and accordingly the number and capacity of file servers for storing data are increasing. In addition, the number of computing nodes is increasing and the number of times of communication between computing nodes and file servers is increasing.

Therefore, when each of the computing nodes individually reads or writes data from or to file servers, the number of communications between the computing nodes and the file servers increases, and an increase in the load of processing of each computing node causes a bottleneck, and thus transfer processing of data between the computing nodes and the file servers may be delayed.

Thus, an approach may be taken in which communication with file servers is performed by only a specific computing node, and thus the number of communications between the computing nodes and the file servers is reduced. However, there is a variation in the data length of transfer data between the computing nodes and the file servers. Therefore, there is a problem in that if a computing node, which is away from another computing node that transfers a large volume of data to a file server, communicates with the file servers, the lad of data transfer between the computing nodes in the parallel computer system is increased.

An aspect of the disclosure aims to reduce the load of data transfer in a parallel computer system.

SUMMARY

According to an aspect of the invention, an information processing apparatus, among a plurality of information processing apparatuses that performs parallel computing processing in a parallel computer system, comprising a memory and a processor coupled to the memory and configured to execute a process including: calculating a centroid position of the information processing apparatuses based on a data length of data for which subsequent reading or writing from or to a file server is requested by the information processing apparatuses and position information on each of the information processing apparatuses; determining a first information processing apparatus that performs data relay according to the calculated centroid position; and collectively receiving or transmitting, when the determined first information processing apparatus that performs data relay is the information processing apparatus, the data for two or more of the information processing apparatuses.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Hereinafter, an embodiment of the present disclosure will be described with reference to the accompanying drawings. It is to be noted that components having substantially the same functional configuration are labeled with the same symbols, and redundant description is omitted.

[Entire Configuration of Parallel Computing System]

Figure 1:
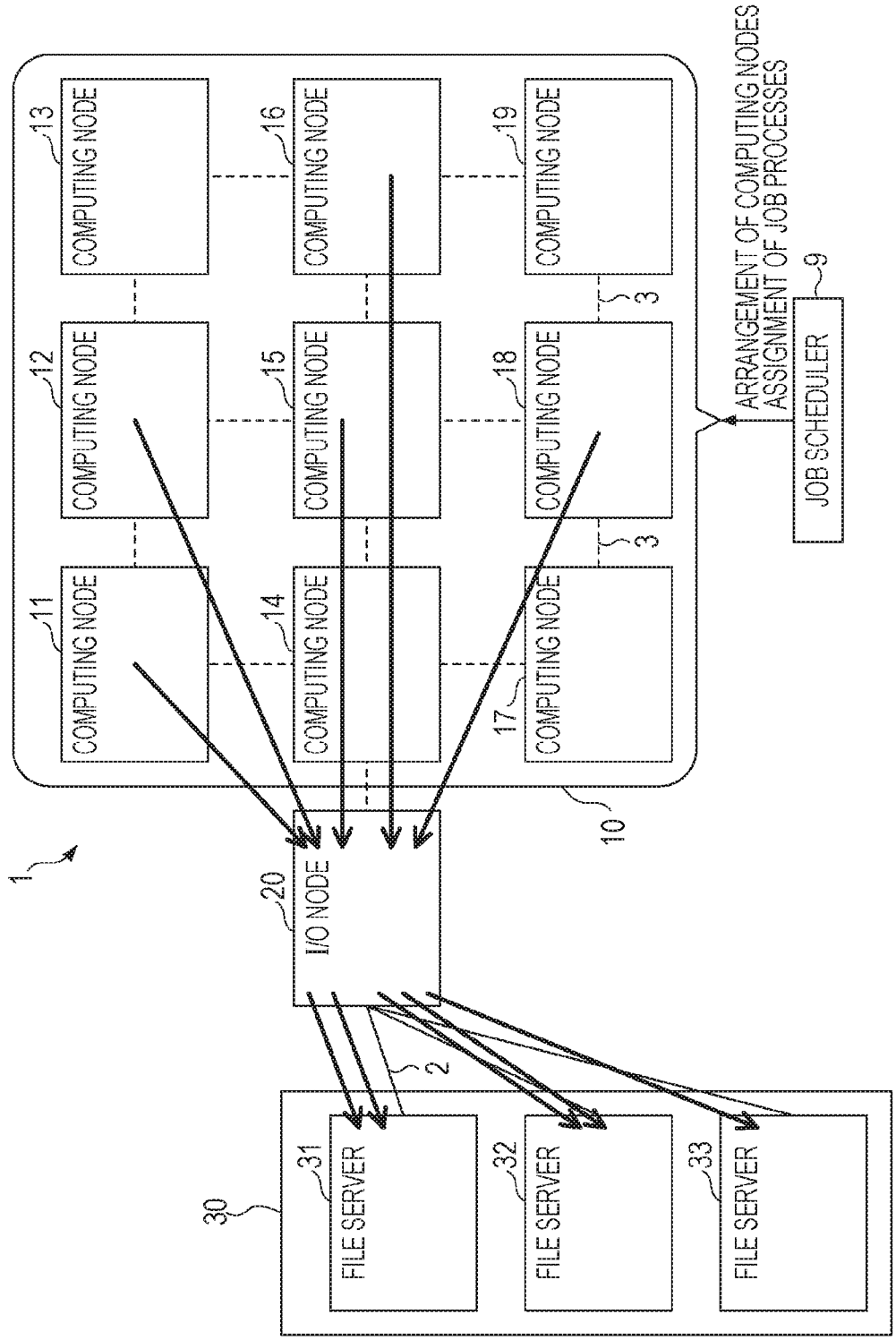
FIG. 1 is a diagram illustrating an individual I/O request in a parallel computing system according to an embodiment.

First, the configuration of parallel computing system 1 according to an embodiment of the present disclosure will be described with reference FIG. 1. The parallel computing system 1 according to the present embodiment illustrated in FIG. 1 has a computing node group 10, an input/output (I/O) node 20, and a file server group 30.

In the parallel computing system 1 according to the present embodiment, a cluster is constructed by connecting computing nodes by a high-speed network to achieve an HPC system. A cluster is constructed by connecting computing nodes 11 to 19 of the computing node group 10 by torus fusion (Tofu) network which is an example of a high-speed network. The computing node group 10 is an example of a computer (information processing device) group that constructs a cluster. The number of the computing nodes included in the computing node group 10 is not limited to nine, and for instance, several ten thousands of computing nodes may be connected in parallel.

Job process scheduler 9 disposes some computing nodes, as the computing node group 10, which are selected from the computing nodes included in the parallel computing system 1. In order to execute a parallel computing processing program for predetermined application by the computing node group 10, the job process scheduler 9 distributes and assigns parallel processes (assignment of job processes) to the computing nodes 11 to 19 and the parallel processes are started up. The computing nodes 11 to 19 execute the calculation processing program for the assigned job processes. Thus, parallel computing processing for predetermined application is performed by the computing node group 10.

The I/O node 20 is connected to the computing node group 10 by a Tofu network, and is connected to the file server group 30 by an InfiniBand (IB) network which is an example of a high-speed network. Although the file server group 30 has three file servers 31 to 33 in the present embodiment, the number of file servers is not limited to three. The file server group 30 holds files that store data to be used by the computing nodes 11 to 19.

The I/O node 20 receives I/O requests from the computing nodes 11 to 19, the I/O requests requesting read or write data from or to the file servers 31 to 33. The I/O node 20 accesses one of the file servers 31 to 33, which stores the requested data or in which the requested data is to be stored. The I/O node 20 writes or reads predetermined data to or from the file servers 31 to 33, and transfers data between the file servers 31 to 33 and the computing node 11 to 19.

Here, in I/O requests from the computing nodes 11 to 19, a request of reading or writing a small amount of data frequently occurs. Therefore, when each of the computing nodes 11 to 19 individually requests reading or writing of data, the number of communications between the computing nodes 11 to 19 and the file servers increases. Thus, an increase in the load of the computing nodes 11 to 19 and the load of the file servers causes a bottleneck, and transfer processing of data may be delayed.

In reading or writing of data individually requested by each of the computing nodes 11 to 19, data transfer is performed in units of a small amount of data, and thus communication of a small size packet is performed many times between the computing nodes 11 to 19 and the file servers. The time taken for data communication is determined by the theoretical value, [latency+(data length/bandwidth)]. A delay due to latency is proportional to the number of packets used. Therefore, when communication of a small size packet is performed many times, an effective bandwidth decreases and transfer processing of data may be delayed.

In addition, the memory space on the file server side tends to be divided, and available memory space in the file servers decreases for I/O requests, and data transfer processing may be delayed.

Thus, in the parallel computing system 1 according to the present embodiment, a single computing node relays and handles accesses to the file servers associated with I/O requests by the computing nodes in a collective manner, and collectively performs reading or writing of data. This reduces the load of processing of the I/O node 20 and the file servers and avoids a delay in data transfer processing.

Hereinafter, a node, which relays and handles accesses to the file servers associated with I/O requests by the computing nodes in a collective manner, and which collectively performs reading or writing of data, is called a "data relay node". The data relay node handles access requests of the computing nodes to file servers, thereby reducing the number of times of transmission and reception to the file servers, and the load of the file servers may be reduced.

Note that the processing, collectively performed by a data relay node, of reading and writing data requested by computing nodes (including the self-node) is also referred to as "Collective I/O processing" (or data sieving). Also, the processing, collectively performed by a data relay node, of reading data from file servers requested by computing nodes (including the self-node) is also referred to as "Collective read processing". Also, the processing, collectively performed by a data relay node, of writing data to file servers requested by computing nodes (including the self-node) is also referred to as "Collective write processing". Here, the term "self-node" means the node itself, which is performing the relevant processing or any operation related thereto.

[Data Relay Node]

Figure 2:
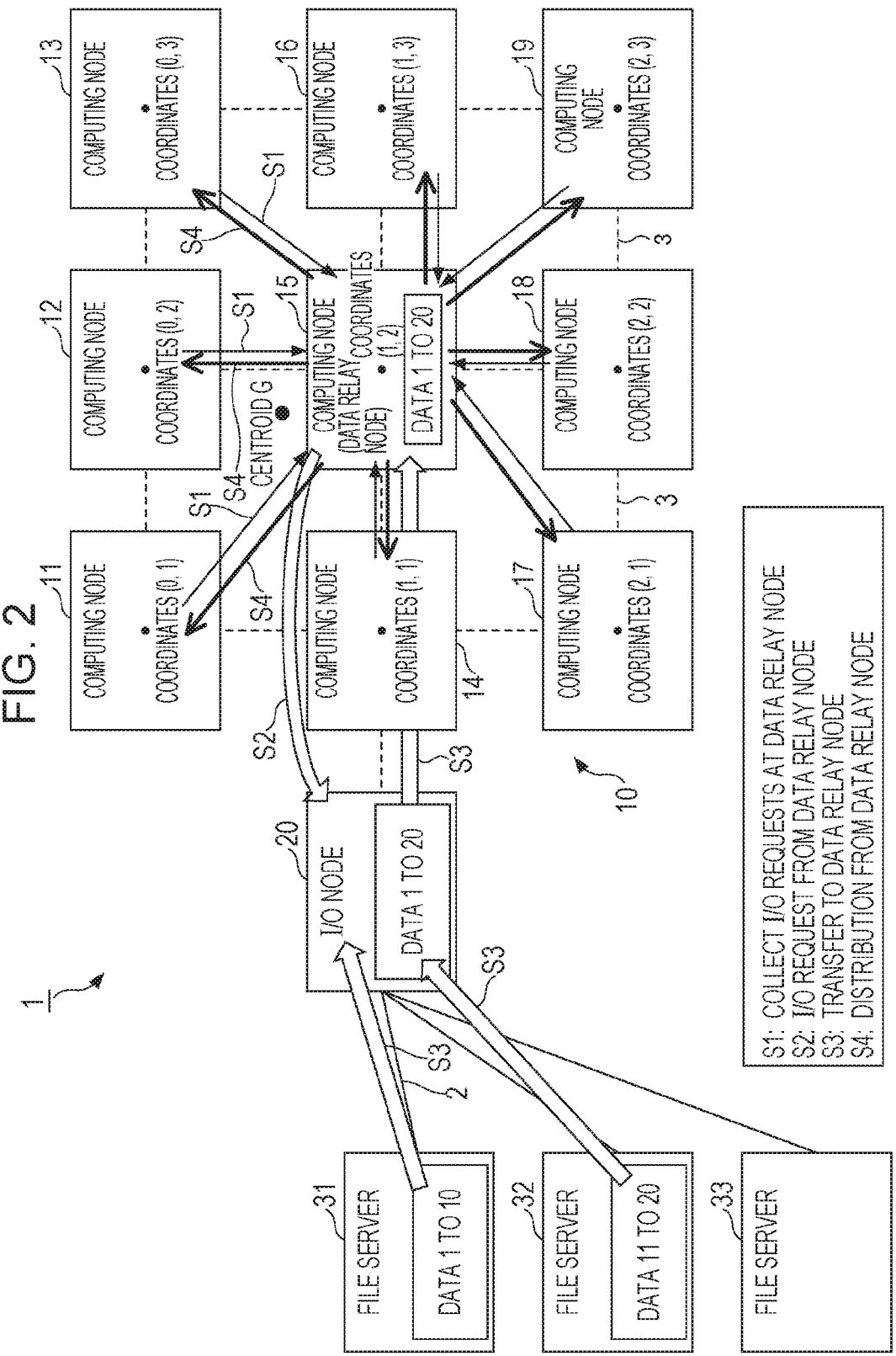
FIG. 2 is a diagram illustrating a Collective I/O request in a parallel computing system according to the embodiment.

The data relay node is one of the computing nodes 11 to 19 and selected therefrom. In FIG. 2, the data relay node is the 5th computing node 15.

The data relay node is disposed at a position that allows efficient Collective I/O processing in consideration of the positions of the computing nodes 11 to 19 and the data lengths (data volumes) of target data of I/O requests (file access requests) based on centroid position G calculated by Expression (1) below.

The cost of collection of data from the computing nodes 11 to 19 and distribution of data to the computing nodes 11 to 19 vary according to a variation in the data lengths of data associated with I/O requests by the computing nodes 11 to 19 and the position of the computing node serving as the data relay node. Thus, it is important to minimize the cost of data collection and data distribution. So in order to achieve uniform load at the time of data collection and data distribution as much as possible, it is preferable to determine one of the computing nodes 11 to 19 to be the data relay node. In the determination, when a delay (latency) due to communication between a computing node serving as the data relay node and other computing nodes is not made sufficiently small, the performance is reduced because of the latency. Because of the reason stated above, a computing node nearest to the calculated centroid position G is determined to be the data relay node in the present embodiment.

In other words, when I/O requests are received from computing nodes, a data relay node is selected based on the data lengths of requested target data and position information on the computing nodes. In the following Expression (1), coordinate vector which is an example of position information on a computing node, and the data length are each regarded as a "weight", and a computing node, which is nearest to the position of the "centroid" calculated based on the "weight", is determined to be the data relay node.

$$G=(d(1)*X(1)+d(2)*X(2) \ldots d(n)*X(n))/(d(1)+d(2)+ \ldots d(n)) \quad (1)$$

In Expression (1), let the data lengths of target data associated with I/O requests by n computing nodes 1, 2, ..., n be d(1), ..., d(n), respectively, and let the coordinate vectors of the computing nodes be X (1), X (2), ..., X (n). For instance, in FIG. 2, the coordinate vectors X(1) of the computing node 11 is the coordinates (0, 1), and the data length of the data requested by the computing node 11 is inputted to d(1).

The centroid position G is calculated by all computing nodes 11 to 19 by utilizing Allreduce communication (for the details of the Allreduce communication, refer to http://mpitutorial.com/tutorials/mpi-reduce-and-allreduce/). In the Allreduce communication, information on the data length d of each computing node and the coordinate vector X of each computing node are shared by all computing nodes. Each of the computing nodes 11 to 19 stands by until information on the data lengths d and the vectors X of all computing nodes is received, and when all the information is received, the centroid position G is calculated based on Expression (1). A computing node at the position nearest to the centroid position G calculated based on Expression (1) is determined to be the data relay node. When the data relay node is determined, the information used for calculation of the centroid position G may be discarded. Also, calculation of the centroid position G and determination of the data relay node are performed for every Collective I/O processing for I/O requests from computing nodes.

Collection of data and distribution of data between the data relay node and other computing nodes are performed by the data relay node utilizing Allreduce communication, thereby minimizing the latency. For instance, the data relay node collects the data (data 1 to 20 in FIG. 2) requested by all computing nodes utilizing Allreduce communication, and performs collection of data and distribution of data in the following steps.

(Step S1)

The data relay node (here, the computing node 15) collects I/O requests having target data of I/O requests and the data lengths of the target data, from all computing nodes 11 to 19 (including the self-node).

(Step S2)

The data relay node collectively transmits the collected I/O requests to the I/O node 20. The I/O node 20 identifies file servers 31, 32 that read or write target data 1 to 10, 11 to 20 of I/O requests, and collectively transfers the I/O request for the data 1 to 10 and the I/O requests of the data 11 to 20.

(Step S3)

The file servers 31, 32 write data according to the I/O requests, or read data according to the I/O requests. For instance, the file server 31 collectively transfers requested data 1 to 10 to the I/O node 20, and the file server 32 collectively transfers requested data 11 to 20 to the I/O node 20. The I/O node 20 collectively transfers the data 1 to 20 to the data relay node. The collectively transferred data 1 to 20 is stored in a relay buffer 107 (see FIG. 3) of the data relay node.

(Step S4)

The data relay node distributes (remote direct memory access (RDMA) transfer) data with respective data lengths requested by other computing nodes to each computing node, and copies data with the data length requested by the self-node.

In this process, when collection of data and distribution of data are performed, establishing one-to-one correspondence between an address in the relay buffer 107 and an offset of a file in the file servers 31 to 33 makes it possible to reduce data to be RDMA-transferred between computing nodes to a minimum.

[Configuration Example of Computing Node]

Figure 3:
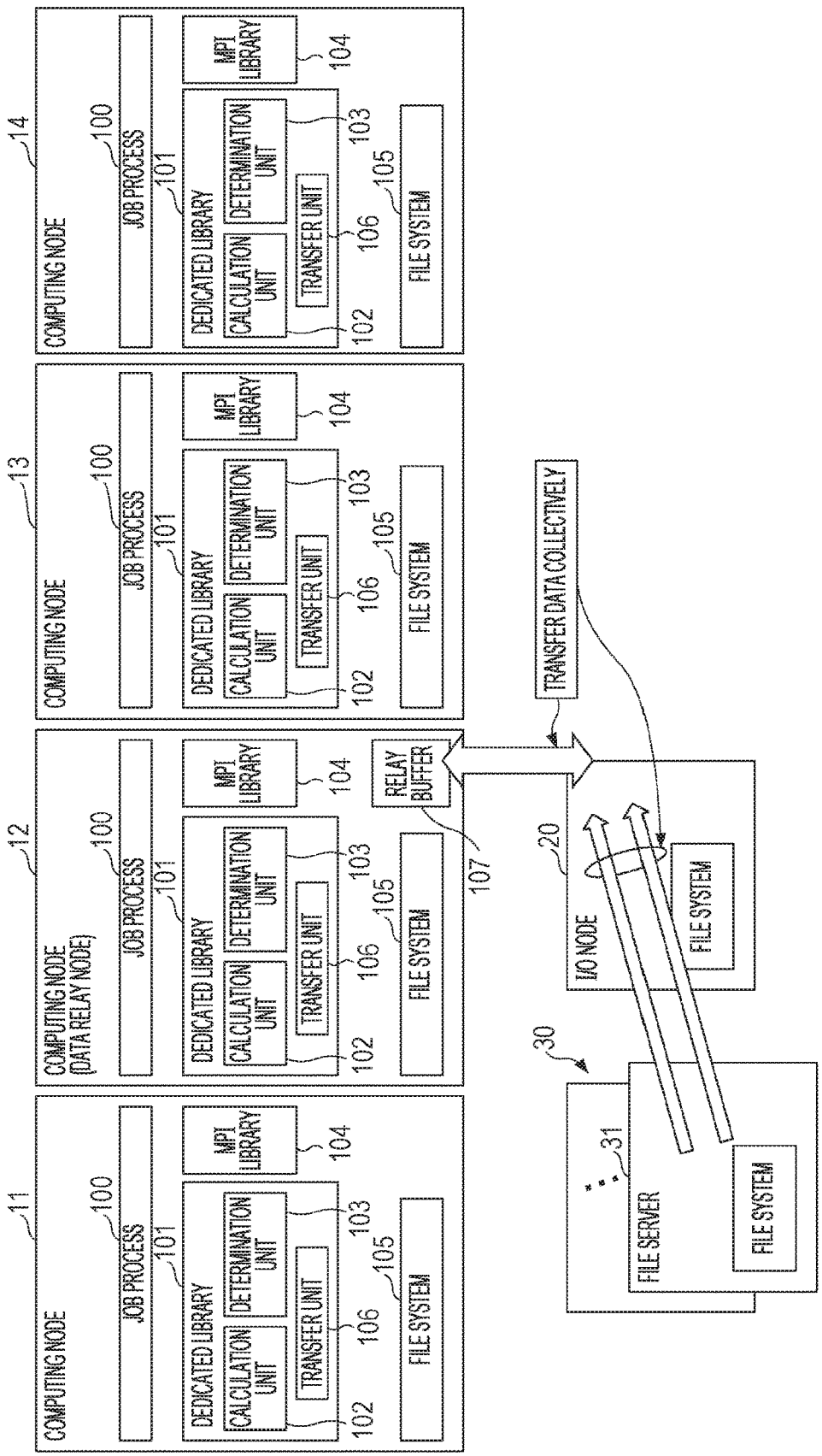
FIG. 3 is a diagram illustrating an example configuration of computing nodes according to the embodiment.

In FIG. 3, four computing nodes 11 to 14 are illustrated as an example of the computing node group 10. The configuration of the computing nodes 11 to 14 is the same as before except that the computing node serving as the data relay node has the relay buffer 107. In FIG. 3, the computing node 12 is the data relay node. In this case, the computing node 12 has a job process 100, a dedicated library 101, an MPI library 104, a file system 105, and a relay buffer 107. The relay buffer 107 once stores the data collectively transferred from the file servers.

Each of the computing nodes has the job process 100, the dedicated library 101, the MPI library 104, and the file system 105 regardless as to whether or not the computing node serves as the data relay node.

In the example of the parallel computing system 1 of FIG. 3, when a parallel processing program is executed, the job process 100 is distributed between the computing nodes 11 to 14 and started up. When the job process 100 is distributed between four computing nodes and started up, interprocess communication for data exchange is performed in the calculation processing defined in the parallel processing program. In the interprocess communication, a parallel processing program written in a communication application program interface (API) called a message passing interface (MPI) is executed. In the interprocess communication, a corresponding subroutine of the MPI library 104 is called and Allreduce communication is performed. This allows completion of collection of data and distribution of data to be managed in all computing nodes 11 to 14. The MPI library 104 manages normal progress of the later-described parallel read processing, parallel write processing, and parallel computing processing. Such management of progress of parallel processing by Allreduce communication may be referred to as "barrier synchronization".

In response to I/O requests made from the computing nodes 11 to 14 to the file servers 31 to 33, a corresponding subroutine in the dedicated library 101 of each of the computing nodes 11 to 14 is called, and the centroid position G is calculated and a data relay node is determined. The function (the function of calculating the centroid position G and the function of determining a data relay node) of the subroutine of the dedicated library 101 is achieved by the calculation unit 102, the determination unit 103, and the transfer unit 106.

The calculation unit 102 calculates the centroid position G based on the data length requested by the self-computing node for subsequent reading or writing from or to a file server, data lengths obtained from other computing nodes, which have been requested by the other computing nodes for subsequent reading or writing, and the coordinate vectors of all computing nodes. The determination unit 103 determines a computing node disposed nearest to the calculated centroid position G to be the data relay node. Here, the term "self-computing node" means the computing node itself, which includes the relevant unit, such as the calculation unit 102, the transfer unit 106, etc., that is performing the relevant processing or any operation related thereto.

The transfer unit 106 performs data transfer with the relay buffer 107. Specifically, when the self-computing node is the data relay node, the transfer unit 106 collectively transfers data requested by the computing nodes for subsequent reading or writing from or to the file servers according to the I/O requests of the computing nodes 11 to 14. For instance, the transfer unit 106 performs step S35, S39 of FIG. 5 and step S51, S53 of FIG. 14 described later.

When the self-computing node is not the data relay node, the transfer unit 106 obtains data according to the I/O request of the self-computing node by PDMA transfer from the relay buffer 107 which stores collectively transferred data from the file servers. When the self-computing node is the data relay node, the data according to the I/O request of the self-computing node is copied from the relay buffer 107.

In the computing node determined to be the data relay node, a corresponding subroutine in the dedicated library 101 is called, and reading and writing of data are performed.

The data relay node collects the I/O requests for reading or writing of data from each computing node, and when the I/O requests from all computing nodes are collected, the data relay node performs Collective I/O processing on the I/O node 20.

The file system 105 operates on an OS and controls reading and writing of a file. The file system 105 receives Collective read processing and Collective write processing and performs processing accordingly.

[Example Execution Processing of Job Process]

Figure 4:
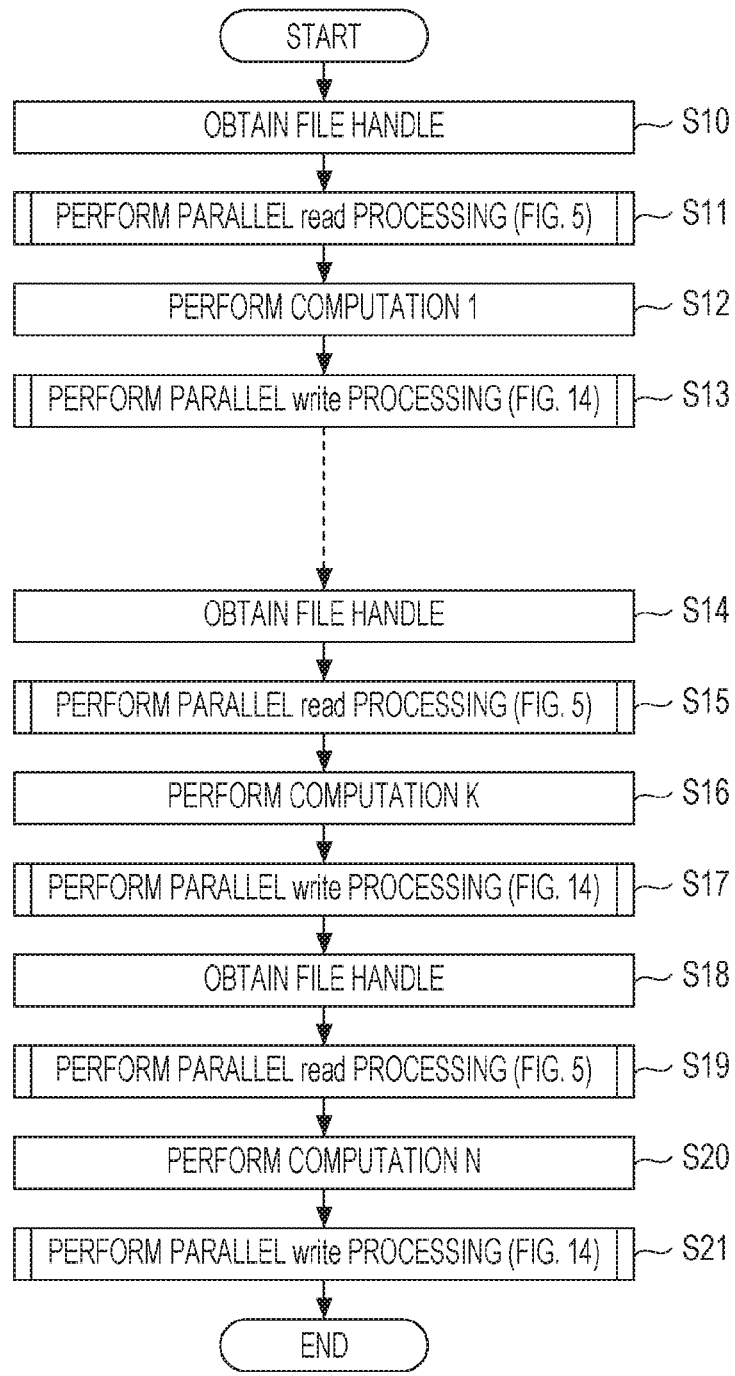
FIG. 4 is a flow chart illustrating example execution processing of job process according to the embodiment.

Next, execution processing of job process according to the present embodiment will be described with reference to FIG. 4. FIG. 4 is a flow chart illustrating example execution processing of job process according to the embodiment. In the execution processing of job process, a file server communication method is performed by the parallel computing system 1.

When the processing of FIG. 4 is started, a corresponding subroutine in the dedicated library 101 of each of the computing nodes 11 to 14 is called, and each of the computing nodes 11 to 14 performs the following job process execution processing in parallel. First, the computing node obtains a file handle (a number of a file that stores the data requested for reading or writing) (step S10). Subsequently, the computing node performs parallel read processing (see FIG. 5) (step S11). In the parallel read processing described later, calculation of the centroid position G, determination of a data relay node, and Collective read processing of data are performed.

Subsequently, the computing node performs the processing for calculation 1 which is an example of parallel computing processing, using the data obtained by the parallel read processing (step S12). Subsequently, the computing node performs parallel write processing (see FIG. 14) (step S13).

Subsequently, the computing node obtains the next file handle (step S14). Subsequently, the computing node performs parallel read processing (step S15). Subsequently, the computing node performs the processing for calculation K using the data obtained by the parallel read processing (step S16). Subsequently, the computing node performs parallel write processing (step S17).

Similarly, the computing node obtains the next file handle (step S18), performs parallel read processing (step S19), performs the processing for calculation K using the data obtained (step S20), performs parallel write processing (step S21), and completes the current processing.

[Example of Parallel Read Processing]

Figure 5:
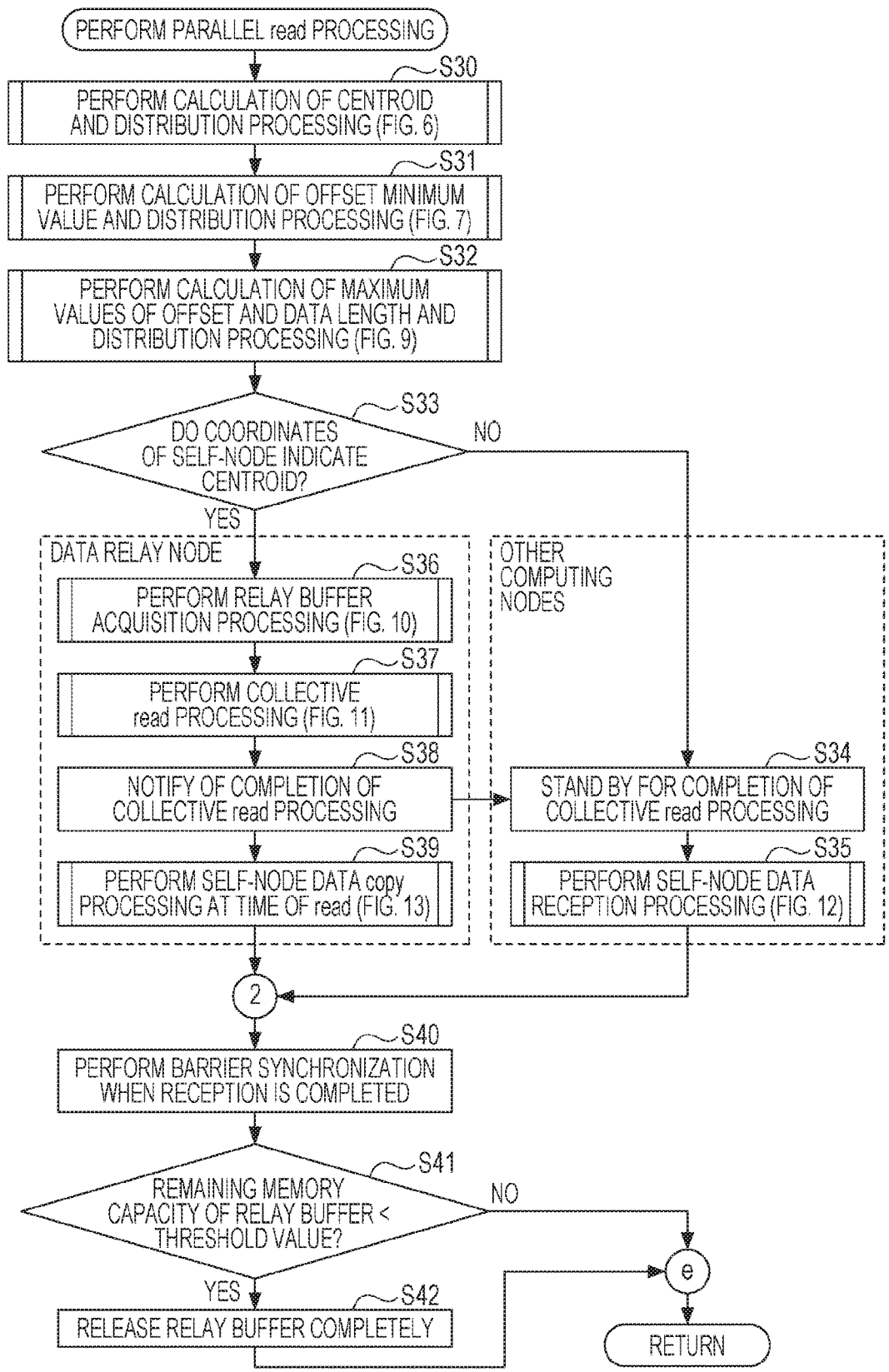
FIG. 5 is a flow chart illustrating example parallel read processing according to the embodiment.

Subsequently, an example of parallel read processing according to the present embodiment illustrated in FIG. 4 will be described with reference to FIG. 5. FIG. 5 is a flow chart illustrating an example of parallel read processing according to the present embodiment. It is to be noted that steps S36 to S39 of FIG. 5 are performed by the computing node serving as the data relay node, and steps S34, S35 are performed by the computing nodes (other computing nodes) different than the computing node serving as the data relay node. Other steps in FIG. 5 are performed by all computing nodes.

Also, calculation processing of the centroid position G performed by all computing nodes is a function of the calculation unit of each computing node, and determination processing of a data relay node performed by all computing nodes is a function of the determination unit of each computing node. In addition, the Collective read processing performed by the computing node serving as the data relay node is a function of the transfer unit of the computing node serving as the data relay node.

Figure 6:
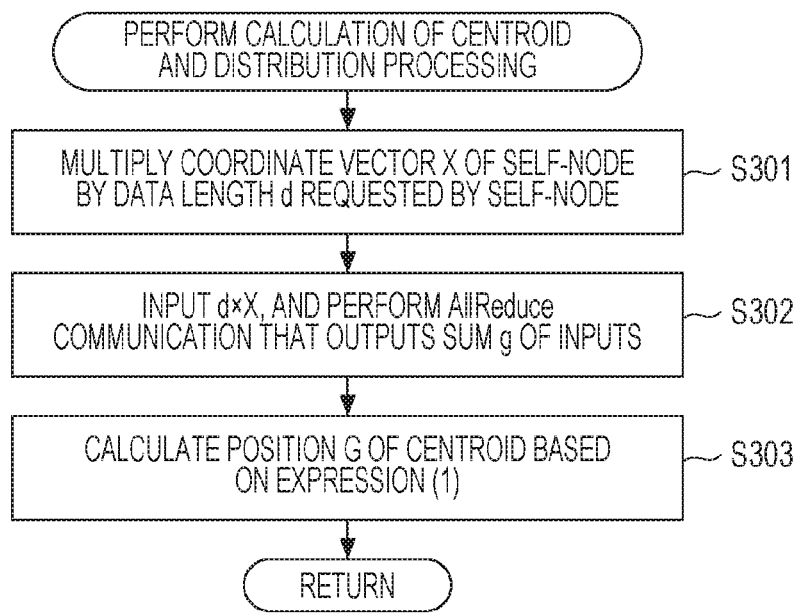
FIG. 6 is a flow chart illustrating an example of centroid calculation and distribution processing according to the embodiment.

When the processing of FIG. 5 is called, the computing node performs the calculation of the centroid and the distribution processing illustrated in FIG. 6 (step S30).

(Example of Centroid Calculation and Distribution Processing)

In the example of centroid calculation and distribution processing illustrated in FIG. 6, each computing node multiplies the coordinate vector X of the self-computing node by the data length d of the self-node (step S301). Subsequently, the computing node inputs the multiplication value (d×X) and performs Allreduce communication that outputs the sum g of the value (step S302).

Thus, for instance, each of the computing nodes 11, 12, 13, 14 of FIG. 2 transmits the data length d of the self-computing node and the multiplication value (d×X), and calculates the centroid position G of the computing node group 10 based on Expression (1) using the sum g of the multiplication values and the sum of all data lengths d of all computing nodes (step S303), then the flow returns to step S30 of FIG. 5.

(Example of Minimum Offset Calculation and Distribution Processing)

Returning to FIG. 5, subsequently, the computing node performs the calculation of an offset minimum value (minimum offset) and the distribution processing illustrated in FIG. 7 (step S31).

Figure 7:
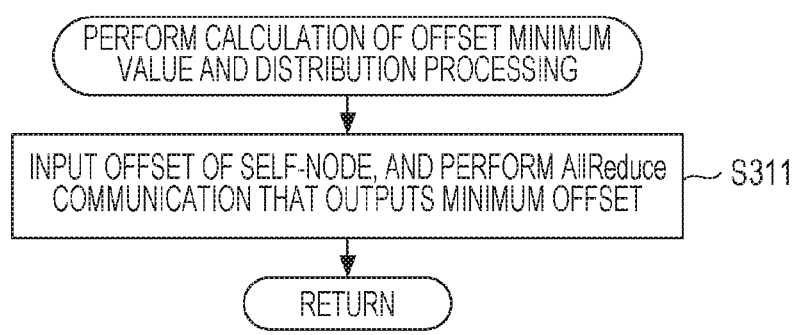
FIG. 7 is a flow chart illustrating an example of minimum offset calculation and distribution processing according to the embodiment.

In the example of the centroid calculation and distribution processing illustrated in FIG. 7, each computing node performs Allreduce communication that receives input of the offset of the self-computing node and outputs a minimum offset (step S311), and the flow returns to step S31 of FIG. 5.

Figure 8:
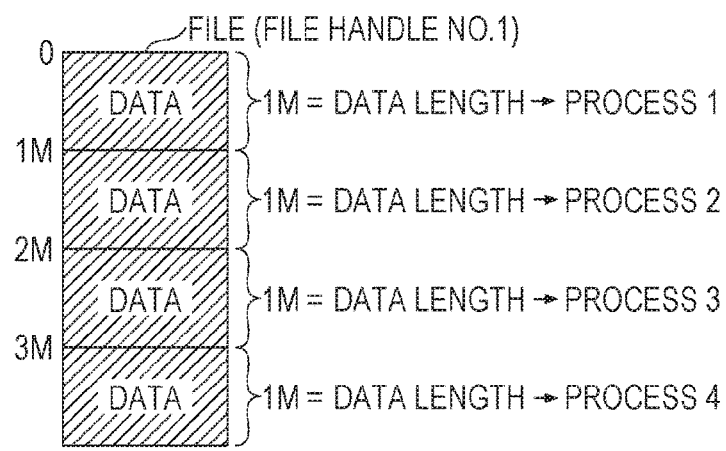
FIGS. 8A and 8B illustrate an example file data structure and an example list shared in Allreduce communication according to the embodiment.

For instance, for the file with file handle No. 1 illustrated in FIG. 8A, an offset of "0" indicating the start of data and data length of data stored in the file are illustrated. For instance, in FIG. 8A, the job process (process 1) of the computing node 11 is assumed to request for reading of data with a data length of 1 M bytes from offset "0". The job process (process 2) of the computing node 12 is assumed to request for reading of data with a data length of 1 M bytes from offset "1 M bytes". The job process (process 3) of the computing node 13 is assumed to request for reading of data with a data length of 1 M bytes from offset "2 M bytes". The job process (process 4) of the computing node 14 is assumed to request for reading of data with a data length of 1 M bytes from offset "3 M bytes".

In this state, in S311, when four computing nodes 11 to 14 receive input of offsets to perform Allreduce communication, the computing nodes 11 to 14 are able to hold list 50 illustrated in FIG. 8B as common information. The list 50 stores information on a process 51, a file handle 52, an offset 53, and a data length 54. Thus, in step S311, the minimum offset "0" is distributed to all computing nodes 11 to 14.

(Example Calculation of Maximum Value of Offset and Data Length and Example Distribution Processing)

Figure 9:
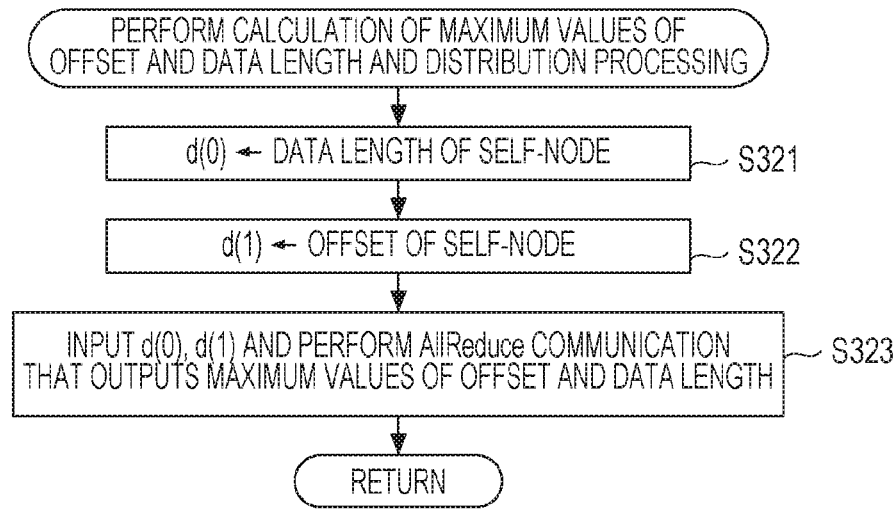
FIG. 9 is a flow chart illustrating example calculation of maximum values of offset and data length and example distribution processing according to the embodiment.

Returning to FIG. 5, the computing node then performs the calculation of maximum values of the offset and data length and the distribution processing illustrated in FIG. 9 (step S32).

In the example of calculation of maximum values of offset and data length and distribution processing illustrated in FIG. 9, each computing node inputs the data length of the self-computing node to d(0) (step S321). Subsequently, the computing node inputs the offset of the self-computing node to d(1) (step S322). Subsequently, the computing node performs Allreduce communication that receives input of the data length d(0) and the offset d(1) of the self-computing node and outputs maximum values of offset and data length (step S323), and the flow returns to step S32 of FIG. 5.

For instance, in the case of the list 50 illustrated in FIG. 8B, in step S323, the maximum value "3M (bytes)" of offset and the data length "1M (bytes)" are distributed to all computing nodes 11 to 14.

Returning to FIG. 5, the computing node then determines whether the coordinate vector of the self-computing node is the closest to the centroid position G (step S33). When it is determined that the coordinate vector of the self-computing node is not the closest to the centroid position G, the computing node determines that the self-computing node is not the data relay node (hereinafter, may be referred to as "other computing node"). In this case, other computing node stands by until Collective read processing is completed (step S34).

Figure 10:
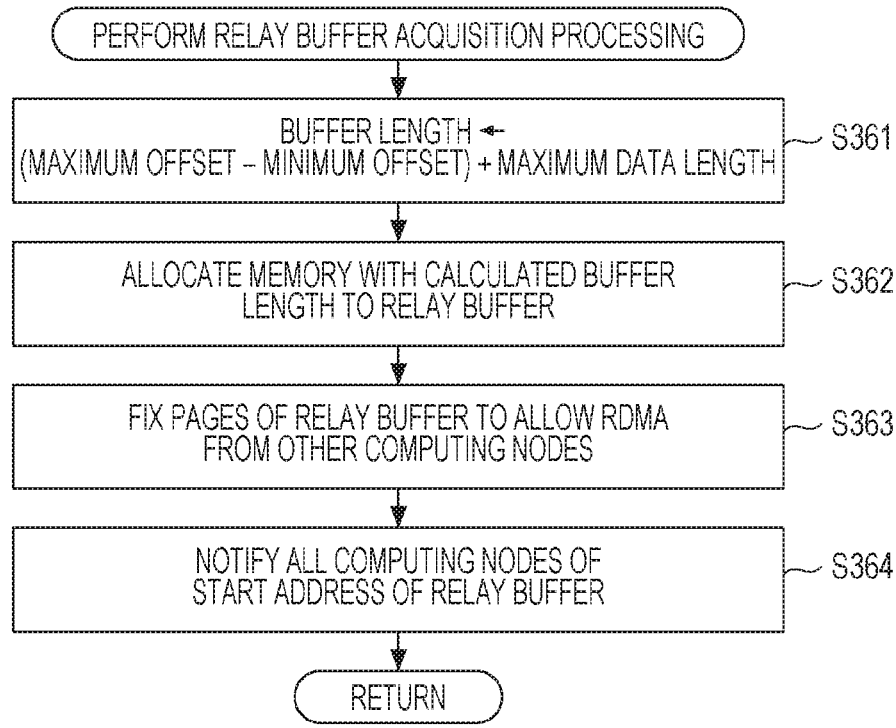
FIG. 10 is a flow chart illustrating example relay buffer acquisition processing according to the embodiment.

When it is determined that the coordinate vector of the self-computing node is the closest to the centroid position G, the computing node determines that the self-computing node is the data relay node and performs the relay buffer acquisition processing illustrated in FIG. 10 (step S36).

(Example of Relay Buffer Acquisition Processing)

In the example of relay buffer acquisition processing illustrated in FIG. 10, the computing node calculates (maximum offset−minimum offset)+maximum data length, and substitutes the calculated value for buffer length (step S361). For instance, in the case of the list 50 of FIG. 8B, the buffer length is 4 M (=(3M−0)+1M) bytes.

Subsequently, the computing node allocates a memory with the calculated buffer length to the relay buffer 107 (step S362). Thus, the relay buffer 107 is acquired to which a memory space with a buffer length desired for parallel read processing is allocated.

The computing node fixes the page of the relay buffer 107 in order to allow RDMA transfer of the data requested by other computing nodes out of the data collectively stored in the relay buffer 107 (step S363). Subsequently, the computing node notifies all computing nodes of the initial address of the relay buffer 107 (step S364), and the flow returns to step S36 of FIG. 5. Thus, each of other computing nodes allows direct transfer of the exact data requested by the other computing node from the relay buffer 107 based on the offset and data length without using the operating system of the data relay node. In this manner, communication with a high throughput and a low latency is achievable.

(Example of Collective Read Processing)

Figure 11:
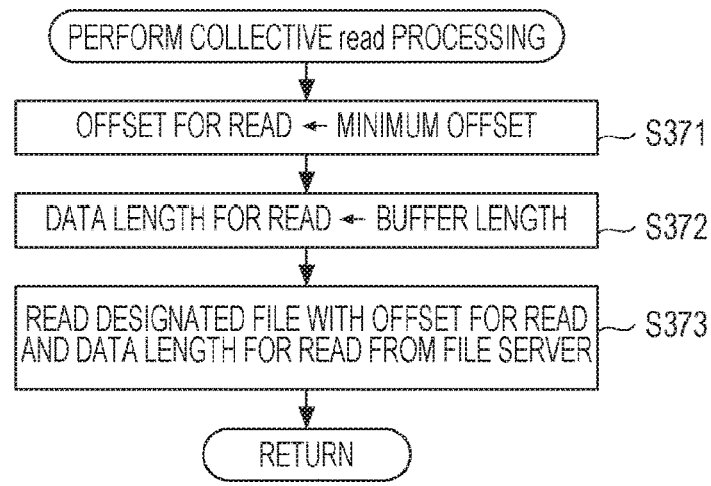
FIG. 11 is a flow chart illustrating example Collective read processing according to the embodiment.

Returning to FIG. 5, the computing node then performs the Collective read processing illustrated in FIG. 11 (step S37). In the example of the Collective read processing illustrated in FIG. 11, the computing node substitutes the minimum offset for offset for read (step S371). Subsequently, the computing node substitutes the buffer length for data length for read (step S372). Subsequently, from a file server, the computing node reads data with the offset for read and the data length for read in a file designated by the file handle (step S373), and the flow returns to step S37 of FIG. 5. This allows collective reading of 4 M bytes of data from the offset "0" in the file designated by, for instance, the file handle No. 1 illustrated in FIG. 8A.

Returning to FIG. 5, the computing node then transmits notification of completion of Collective Read processing (step S38). The computing nodes other than the data relay node (other computing nodes) which have received the notification of completion of Collective Read processing perform the self-node data reception processing illustrated in FIG. 12 (step S35).

(Self-Node Data Reception Processing)

Figure 12:
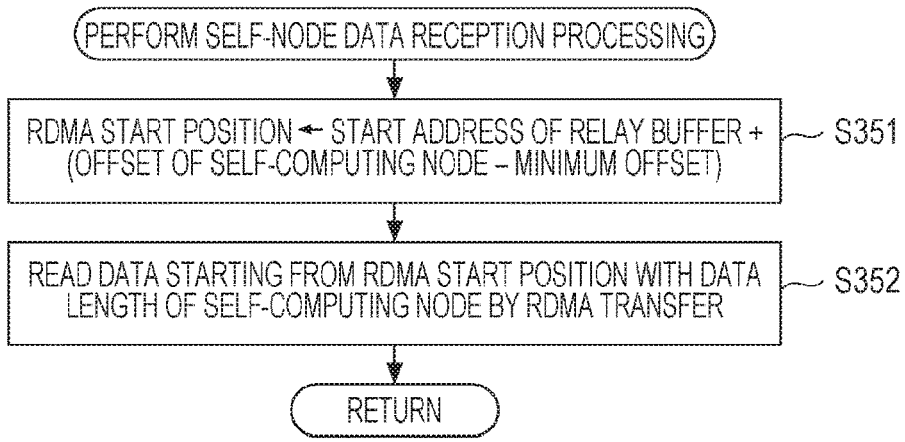
FIG. 12 is a flow chart illustrating example self-node data reception processing according to the embodiment.

In the example of the self-node data reception processing illustrated in FIG. 12, the computing node sets RDMA starting position to the calculation result of "(offset of self-computing node−minimum offset)+the initial address of the relay buffer 107" (step S351). Subsequently, the computing node reads data with the data length of the self-computing node from the RDMA starting position by RDMA transfer (step S352), and the flow returns to step S35 of FIG. 5, then proceeds to "2".

For instance, in the case of the list 50 illustrated in FIG. 8B, each of other computing nodes performing the process 1 RDMA-transfers 1 M bytes of data only starting from the address of the relay buffer 107 according to the offset "0". Each of other computing nodes performing the process 3 RDMA-transfers 1 M bytes of data only starting from the address of the relay buffer 107 according to the offset "2M (bytes)". Each of other computing nodes performing the process 4 RDMA-transfers 1 M bytes of data only starting from the address of the relay buffer 107 according to the offset "3M (bytes)".

Figure 13:
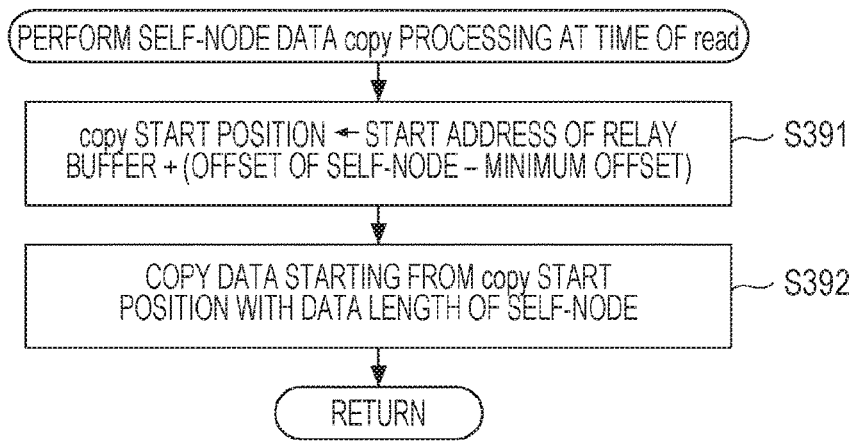
FIG. 13 is a flow chart illustrating example self-node data copy processing at the time of read according to the embodiment.

On the other hand, the computing node as the data relay node, after transmitting the notification of completion of Collective Read processing (step S38), performs self-node data copy processing at the time of read illustrated in FIG. 13 (step S39).

(Self-Node Data Copy Processing at Time of Read)

In the example of the self-node data copy processing at the time of read illustrated in FIG. 13, the computing node sets copy starting position to the calculation result of "(offset of self-node−minimum offset)+the initial address of the relay buffer 107" (step S391). Subsequently, the computing node copies data with the data length of the self-node from the copy starting position (step S392), and the flow returns to step S39 of FIG. 5, then proceeds to "2".

Returning to FIG. 5, the computing node performs barrier synchronization when reception is completed (step S40). Subsequently, the computing node determines whether the remaining memory capacity of the relay buffer 107 is smaller than a predetermined threshold value (step S41).

When it is determined that the remaining memory capacity of the relay buffer 107 is smaller than the predetermined threshold value (step S42), the computing node releases the relay buffer 107 completely (step S42), and terminates the current processing. On the other hand, when it is determined that the remaining memory capacity of the relay buffer 107 is larger than or equal to the predetermined threshold value, the computing node terminates the current processing as it is.

[Example of Parallel Write Processing]

Figure 14:
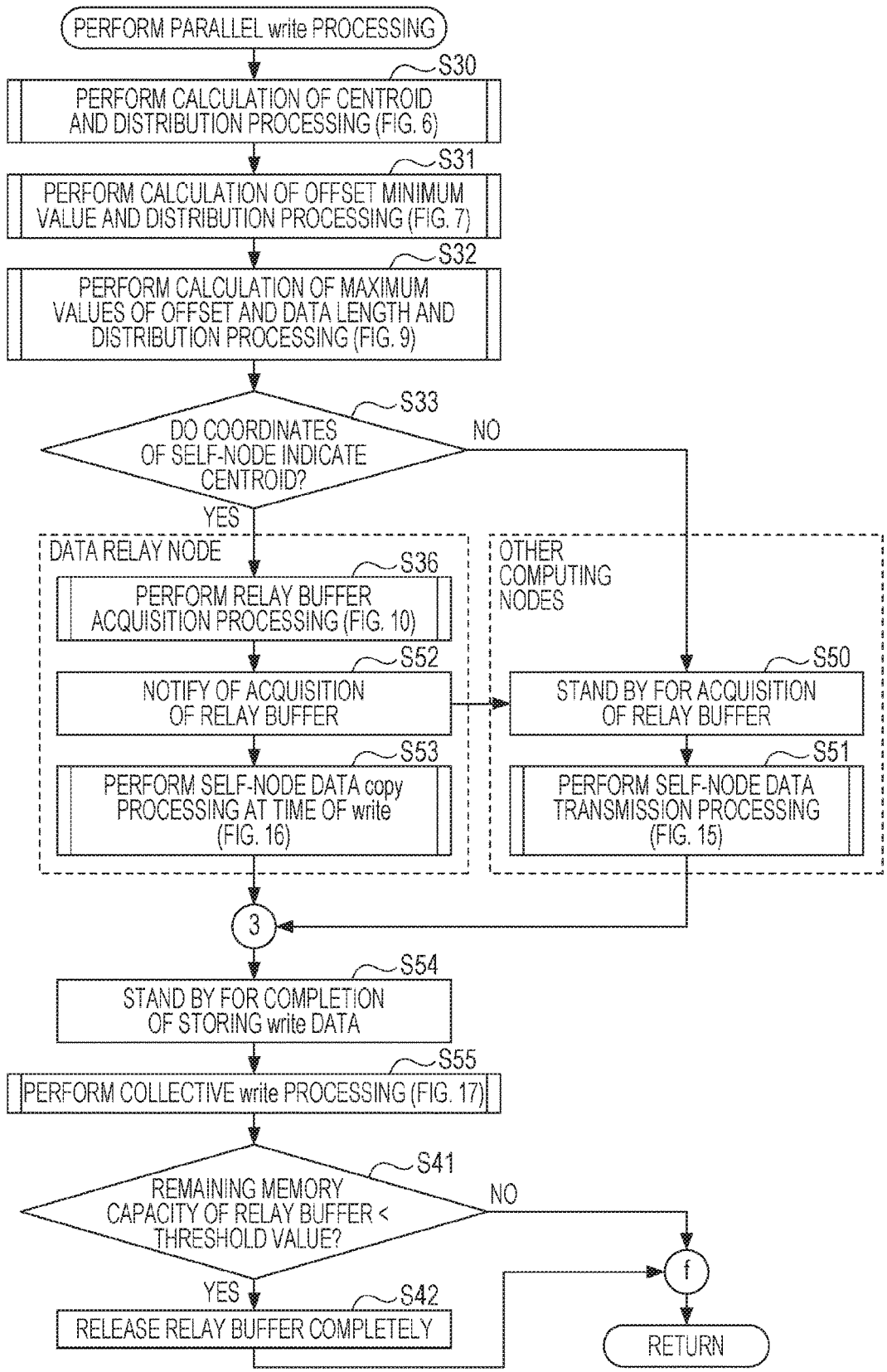
FIG. 14 is a flow chart illustrating example parallel write processing according to the embodiment.

Subsequently, an example of parallel write processing according to the present embodiment illustrated in FIG. 4 will be described with reference to FIG. 14. FIG. 14 is a flow chart illustrating an example of parallel write processing according to the embodiment. It is to be noted that steps S36, S52 to S55 of FIG. 14 are performed by the computing node serving as the data relay node, and steps S50, S51 are performed by the computing nodes (other computing nodes) different than the computing node serving as the data relay node. Other steps in FIG. 14 are performed by all computing nodes.

Also, calculation processing of the centroid position G performed by all computing nodes is a function of the calculation unit of each computing node, and determination processing of a data relay node performed by all computing nodes is a function of the determination unit of each computing node. In addition, the Collective write processing performed by the computing node serving as the data relay node is a function of the transfer unit of the computing node serving as the data relay node.

When the processing of FIG. 14 is called, the computing node performs the calculation of the centroid and the distribution processing illustrated in FIG. 6 (step S30). The calculation of the centroid and the distribution processing illustrated in FIG. 6 have been described in the parallel read processing, and thus a description is omitted.

Subsequently, the computing node performs the calculation of an offset minimum value and the distribution processing illustrated in FIG. 7 (step S31). The calculation of an offset minimum value and the distribution processing in FIG. 7 have been described in the parallel read processing, and thus a description is omitted.

The computing node then performs the calculation of maximum values of the offset and data length and the distribution processing illustrated in FIG. 9 (step S32). The calculation of maximum values of the offset and data length and the distribution processing in FIG. 9 have been described in the parallel read processing, and thus a description is omitted.

Subsequently, the computing node determines whether the coordinate vector of the self-computing node is the closest to the centroid position G (step S33). When it is determined that the coordinate vector of the self-computing node is not the closest to the centroid position G, the computing node determines that the self-computing node is one of other computing nodes different from than the data relay node, and stands by until notification of completion of the acquisition processing of the relay buffer 107 is received (step S50).

When it is determined that the coordinate vector of the self-computing node is the closest to the centroid position G, the computing node determines that the self-computing node is the data relay node and performs the relay buffer acquisition processing illustrated in FIG. 10 (step S36). The relay buffer acquisition processing in FIG. 10 has been described in the parallel read processing, and thus a description is omitted.

Subsequently, the computing node transmits notification of completion of the relay buffer acquisition processing (step S52). The computing nodes other than the data relay node (other computing nodes) which have received the notification of completion of the relay buffer acquisition processing perform self-node data transmission processing illustrated in FIG. 15 (step S51).

(Self-Node Data Transmission Processing)

Figure 15:
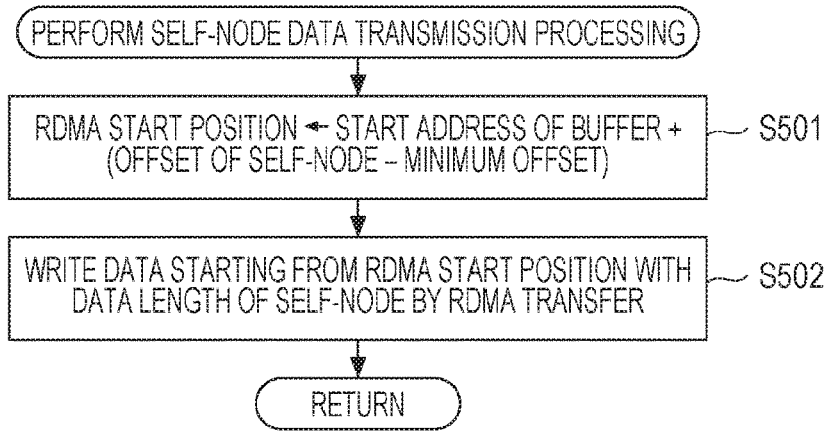
FIG. 15 is a flow chart illustrating example self-node data transmission processing according to the embodiment.

In the example of the self-node data transmission processing illustrated in FIG. 15, the computing node sets RDMA starting position to the calculation result of "(offset of self-node−minimum offset)+the initial address of the relay buffer 107" (step S501). Subsequently, the computing node writes data with the data length of the self-node from the RDMA starting position by RDMA transfer (step S502), and the flow returns to step S51 of FIG. 14, then proceeds to "3".

Figure 16:
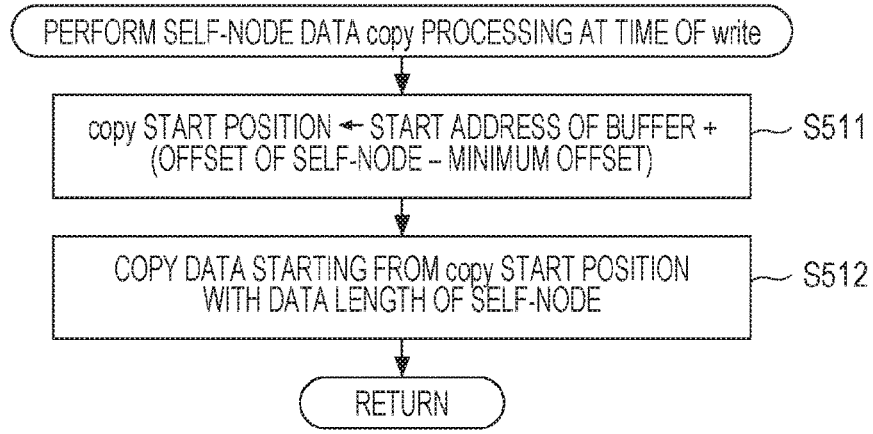
FIG. 16 is a flow chart illustrating example self-node data copy processing at the time of write according to the embodiment.

On the other hand, the computing node as the data relay node, after transmitting the notification of completion of relay buffer acquisition processing (step S52), performs self-node data copy processing at the time of write illustrated in FIG. 16 (step S53).

(Self-Node Data Copy Processing at Time of Write)

In the example of self-node data copy processing at the time of write illustrated in FIG. 16, the computing node sets copy starting position to the calculation result of "(offset of self-node−minimum offset)+the initial address of the relay buffer 107" (step S511). Subsequently, the computing node copies data with the data length of the self-node from the copy starting position (step S512), and the flow returns to step S53 of FIG. 14, then proceeds to "3".

Subsequent to "3" of FIG. 14, the computing node stands by until all computing nodes complete storing of data to the relay buffer 107 of the self-node data (step S54).

(Example of Collective Write Processing)

Figure 17:
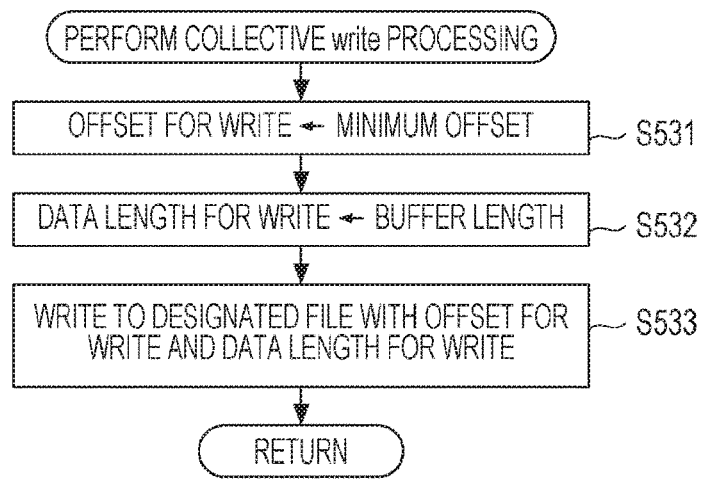
FIG. 17 is a flow chart illustrating example Collective write processing according to the embodiment.

Subsequently, when all computing nodes complete storing of self-node data to the relay buffer 107, the computing node performs Collective Write processing illustrated in FIG. 17 (step S55). In the example of the Collective Write processing illustrated in FIG. 17, the computing node substitutes the minimum offset for offset for write (step S531). Subsequently, the computing node substitutes the buffer length for data length for write (step S532). Subsequently, the computing node writes data with the offset for write and the data length for write in a file designated by the file handle (step S533), and the flow returns to step S55 of FIG. 14. Thus, for instance, the data requested from all computing nodes is collectively written to the file.

Subsequently, the computing node determines whether the remaining memory capacity of the relay buffer 107 is smaller than a predetermined threshold value (step S41). When it is determined that the remaining memory capacity of the relay buffer 107 is smaller than the predetermined threshold value (step S42), the computing node releases the relay buffer 107 completely (step S42), and terminates the current processing. On the other hand, when it is determined that the remaining memory capacity of the relay buffer 107 is larger than or equal to the predetermined threshold value, the computing node terminates the current processing as it is.

As described above, in the parallel computing system 1 according to the present embodiment, input/output from the job process executed by each computing node is handled by the data relay node. In this manner, it is possible to reduce the load of the file servers and to increase the efficiency of distribution of desired data to the computing nodes. In addition, it is possible to avoid a larger number of times of communication using a small size packet between computing nodes and file servers. Furthermore, the memory space on the file server side is not likely to be divided, and decrease in the available memory space in the file servers for I/O requests is avoidable. Consequently, it is possible to reduce the load of data transfer in the parallel computer system 1.

(Hardware Configuration Example)

Figure 18:
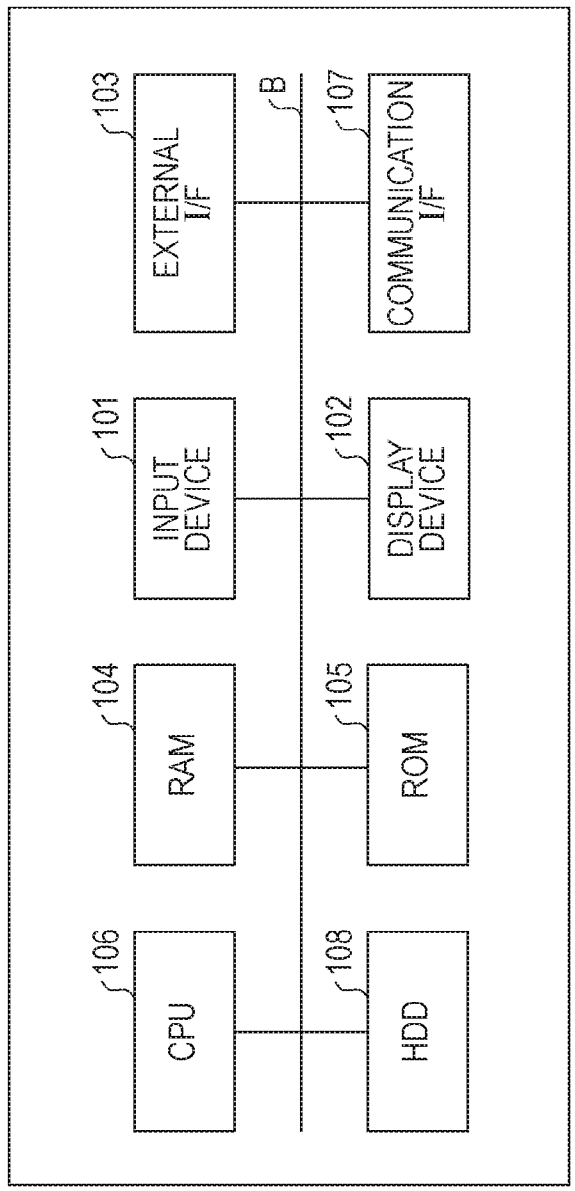
FIG. 18 is a flow chart illustrating an example hardware configuration of a computing node according to the embodiment.

Finally, the hardware configuration of the computing node according to the present embodiment will be described with reference to FIG. 18. FIG. 18 illustrates an example hardware configuration of a computing node according to the present embodiment. The computing node includes an input device 101, a display device 102, an external I/F 103, a random access memory (RAM) 104, a read only memory (ROM) 105, a central processing unit (CPU) 106, a communication I/F 107, and a hard disk drive (HDD) 108, which are connected to one another via a bus B. The CPU 106 may be a microprocessor or any kind of processor.

The input device 101 is used to input operation signals to a computing node. The display device 102 includes a display and displays various types of data. The communication I/F 107 is an interface that connects a computing node to a high-speed network such as Tofu network 3. Thus, each computing node and other computing nodes are able to work together via Tofu network 3 to perform parallel computing processing.

HDD 108 is a nonvolatile storage device that stores programs and data. The HDD 108 may store a parallel processing program, a program that calculates the centroid position G, a program that determines a data relay node. Any program to be executed by the computing node may be stored in the RAM 104, the ROM 105, HDD 108, or any other type of memory device.

An external I/F 103 is an interface with an external device. This allow the computing node to read or write data from or to an external device. A ROM 105 is a nonvolatile semiconductor memory which retains basic programs and is able to retain internal data even with power off. A RAM 104 is a volatile memory that temporarily retains programs and data. A CPU 106 reads a program or data from the HDD 108 or the ROM 105 to the RAM 104 and performs predetermined processing using an operation system. Thus, the functions mounted in each computing node, such as parallel computing processing, Collective read, Collective write processing are achieved.

Although the information processing apparatus, the parallel computer system, the file server communication program, and the file server communication system have been described so far using the embodiment, the information processing apparatus, the parallel computer system, the file server communication program, and the file server communication system according to the present disclosure are not limited to the embodiment, and various modifications and improvements may be made within the scope of the present disclosure. Also, when several embodiments and modifications are possible, they may be combined in a range without contradiction.

For instance, in the embodiment, when the centroid position G of Expression (1) is calculated, the data length of target data of an I/O request and the coordinate vector of each computing node are distributed to all computing nodes by Allreduce communication. However, each computing node may pre-record the information on the coordinate vectors of all computing nodes. In this case, when the centroid position G of Expression (1) is calculated, each computing node only has to distribute the data length of target data of an I/O request by Allreduce communication, and the coordinate vector of the self-computing node does not have to be distributed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing apparatus among a plurality of information processing apparatuses that perform parallel computing processing in a parallel computer system, wherein the information processing apparatuses are coupled to each other and also coupled to a file server, the information processing apparatus comprising;

a memory, and a processor coupled to the memory and configured to execute a process comprising:

determining a data length of target data associated with input/output requests between the information processing apparatus and the file server;

determining a coordinate vector of the information processing apparatus;

receiving data lengths and coordinate vectors from each of other information processing apparatuses among the information processing apparatuses;

calculating a centroid position of the information processing apparatuses based on the determined data length, the determined coordinate vector, and the received data lengths and coordinate vectors from each of the other information processing apparatuses;

determining a specific information processing apparatus, from among the information processing apparatuses, which is nearest to the calculated centroid position; and when the specific information processing apparatus is determined to be the information processing apparatus, at least one of receiving and transmitting data identified in subsequent input/output requests between the file server and two or more of the other information processing apparatuses.

2. The information processing apparatus according to claim 1, wherein when the determined specific information processing apparatus is not the information processing apparatus, the process executed by the processor of the information processing apparatus further comprises receiving/transmitting the target data, associated with the subsequent input/output requests by the information processing apparatus, from/to the determined specific information processing apparatus.

3. A parallel computer system that performs parallel computing processing by a plurality of information processing apparatuses, wherein the information processing apparatuses are coupled to each other and also coupled to a file server, each of the information processing apparatuses comprising;

a memory, and a processor coupled to the memory and configured to execute a process comprising:

determining a data length of target data associated with input/output requests between the information processing apparatus and the file server;

determining a coordinate vector of the information processing apparatus;

receiving data lengths and coordinate vectors from each of other information processing apparatuses among the information processing apparatuses;

calculating a centroid position of the information processing apparatuses based on the determined data length, the determined coordinate vector, and the received data lengths and coordinate vectors from each of the other information processing apparatuses;

determining a specific information processing apparatus, from among the information processing apparatuses, which is nearest to the calculated centroid position; and when the specific information processing apparatus is determined to be the information processing apparatus, at least one of receiving and transmitting data identified in subsequent input/output requests between the file server and each of the other information processing apparatuses.

4. The parallel computer system according to claim 3, wherein when the determined specific information processing apparatus is not the information processing apparatus, the process executed by the processor of the information processing apparatus further comprises receiving/transmitting the target data, associated with the subsequent input/output requests by the information processing apparatus, from/to the determined specific information processing apparatus.

5. A file server communication program, stored in a non-transitory and computer-readable medium, that causes a computer to execute a communication processing method with a file server in a parallel computer system that performs parallel computing processing by a plurality of information processing apparatuses, the communication processing method comprising:

to determine a data length of target data associated with input/output requests between the information processing apparatus and the file server;

to determine a coordinate vector of the information processing apparatus;

to receive data lengths and coordinate vectors from each of other information processing apparatuses among the information processing apparatuses;

to calculate a centroid position of the information processing apparatuses based on the determined data length, the determined coordinate vector, and the received data lengths and coordinate vectors from each of the other information processing apparatuses;

to determine a specific information processing apparatus, from among the information processing apparatuses; and when the specific information processing apparatus is determined to be the information processing apparatus, to at least one of receive and transmit data identified in subsequent input/output requests between the file server and each of the other information processing apparatuses.

6. The file server communication program according to claim 5, wherein when the determined specific information processing apparatus is not the information processing apparatus, the communication processing method further comprising receiving/transmitting the target data associated with the subsequent input/output requests by the information processing apparatus from/to the determined specific information processing apparatus.

* * * * *